US012801130B2

(12) United States Patent
Banga et al.

(10) Patent No.: US 12,801,130 B2
(45) Date of Patent: Nov. 17, 2026

(54) ASSESSING A GOODNESS OF PREDICTION OF A MODEL IN A SENSOR SYSTEM

(71) Applicant: Minitab, LLC, State College, PA (US)

(72) Inventors: Senin J. Banga, State College, PA (US); Cheryl L. Pammer, San Diego, CA (US)

(73) Assignee: Minitab, LLC, State College, PA (US)

( * ) Notice: Subject to any disclaimer, the term of this patent is extended or adjusted under 35 U.S.C. 154(b) by 281 days.

(21) Appl. No.: 18/904,884

(22) Filed: Oct. 2, 2024

(65) Prior Publication Data

US 2026/0093251 A1 Apr. 2, 2026

(51) Int. Cl.
*G05B 23/02* (2006.01)
*G05B 13/04* (2006.01)

(52) U.S. Cl.
CPC ......... *G05B 23/027* (2013.01); *G05B 13/048* (2013.01)

(58) Field of Classification Search
None
See application file for complete search history.

(56) References Cited

U.S. PATENT DOCUMENTS

2017/0351241 A1* 12/2017 Bowers .................. G06N 5/022
2018/0060744 A1* 3/2018 Achin .................... G06N 20/00
2021/0089937 A1* 3/2021 Zhang ...................... G06N 5/04

OTHER PUBLICATIONS

Brooks, G. P. Brooks and Barcikowski, R. S. (2012). The PEAR method for sample sizes in multiple linear regression. Multiple Linear Regression Viewpoints, 38(2), 1-16.
Browne, M. W. (1975). Predictive validity of a linear regression equation. British Journal of Mathematical and Statistical Psychology, 28, 79-87.
Helland, I. S.(1987). On the Interpretation and Use of R2 in Regression Analysis, Biometrics , vol. 43, No. 1, pp. 61-69.
Park, C. N. and Dudycha, A. L. (1974). A cross-validation approach to sample size determination for regression models. Journal of the American Statistical Association, 69, 214-218.

* cited by examiner

*Primary Examiner* — David Earl Ogg

(57) ABSTRACT

Systems and methods to extract raw data from a sensor array of a system, obtain a pool of predictive models, for each predictive model of the pool of predictive models, generate a square cross-validated correlation (SCVC) using the raw data as predictors, for a predictive model with the highest SCVC, generate a proportional loss in predictive power (PLPP), and responsive to the PLPP of the predictive model with the highest SCVC meeting a predetermined pass criteria, deploy the predictive model with the highest SCVC as a principal predictive model to provide an early alert about a failing parameter of the system when new raw data is generated by the sensor array.

20 Claims, 7 Drawing Sheets

ASSESSING A GOODNESS OF PREDICTION OF A MODEL IN A SENSOR SYSTEM

BACKGROUND

Technical Field

The present disclosure generally relates to a sensor system, and more particularly, to enhancing the evaluation of predictive power in predictive models in a sensor system via a goodness of prediction evaluation.

Description of the Related Art

A variety of approaches and instruments may be used in predictive analytics and model evaluation techniques to examine past data and forecast future trends or events. Large datasets are analyzed using algorithms, machine learning models, and data mining techniques to find patterns and relationships. To make sure that predictive models produce solid and significant findings, model assessment approaches are essential for evaluating the performance, accuracy, and dependability of these models.

BRIEF SUMMARY

According to an embodiment, one or more a non-transitory computer readable storage media store program instructions which, when executed by a processor, causes the processor to perform a procedure including extracting raw data with a sensor array of a system, obtaining a pool of predictive models, for each predictive model of the pool of predictive models, generating a square cross-validated correlation (SCVC) using the raw data as predictors, and for a predictive model with the highest SCVC, generating a proportional loss in predictive power (PLPP). In response to the PLPP of the predictive model with the highest SCVC meeting a predetermined pass criteria, the predictive model with the highest SCVC is deployed as a principal predictive model to provide an early alert about a failing parameter of the system when new raw data is generated by the sensor array.

According to an embodiment, a system includes a sensor array that includes a plurality of sensors. The system also includes a processor configured to extract raw data from the sensor array, obtain a pool of predictive models, and for each predictive model of the pool of predictive models, generate a square cross-validated correlation (SCVC) using the raw data as predictors. For a predictive model with the highest SCVC, the processor generates a proportional loss in predictive power (PLPP), and responsive to the PLPP of the predictive model with the highest SCVC meeting a predetermined pass criteria, the processor deploys the predictive model with the highest SCVC as a principal predictive model to provide an early alert about a failing parameter of the system when new raw data is generated by the sensor array.

According to an embodiment of the present disclosure, a method is disclosed to extract raw data from a sensor array of a system, obtain a pool of predictive models, and for each predictive model of the pool of predictive models, generate a square cross-validated correlation (SCVC) using the raw data as predictors. For a predictive model with the highest SCVC, the method generates a proportional loss in predictive power (PLPP), and responsive to the PLPP of the predictive model with the highest SCVC meeting a predetermined pass criteria, the method deploys the predictive model with the highest SCVC as a principal predictive model to provide an early alert about a failing parameter of the system when new raw data is generated by the sensor array.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
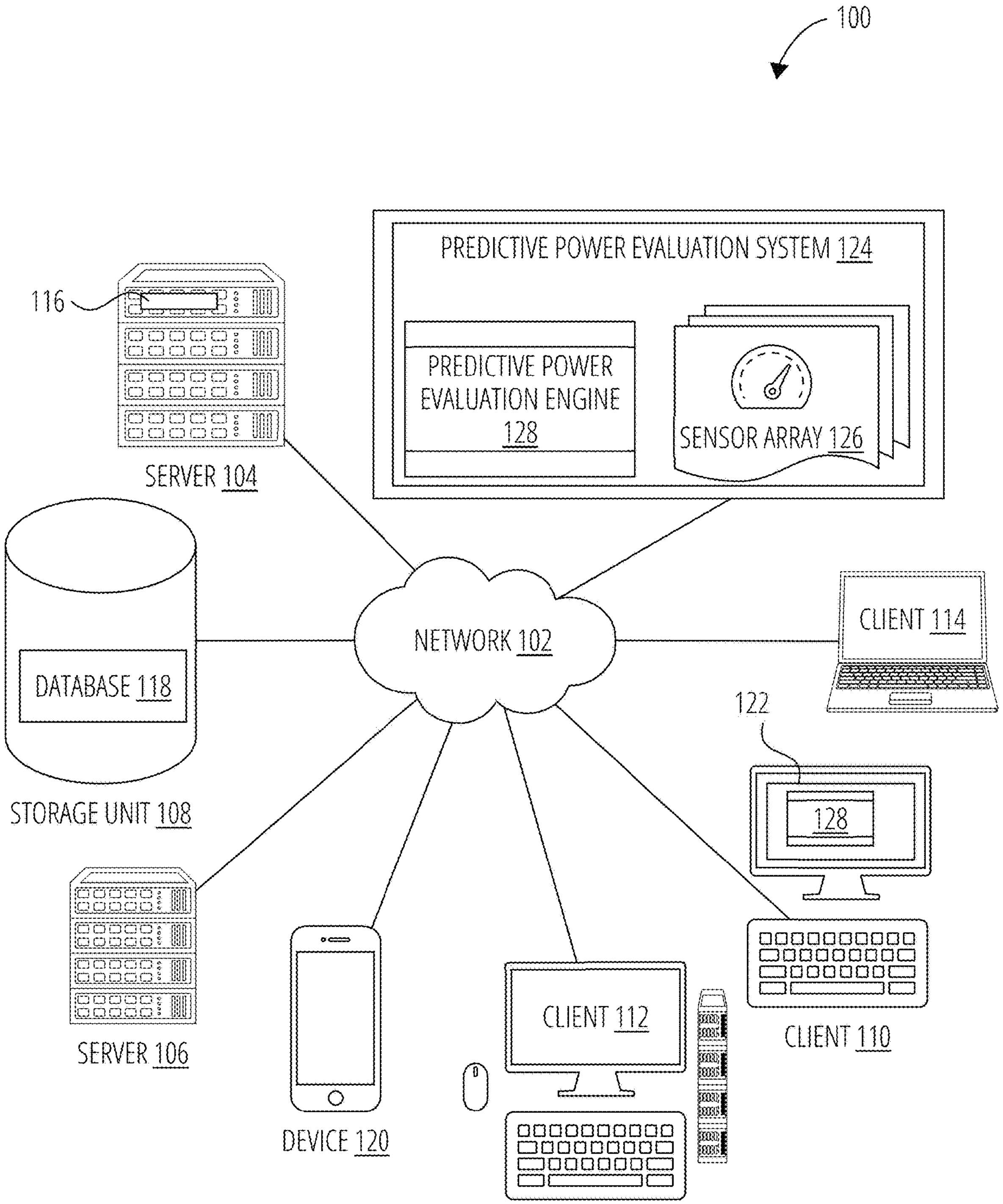
FIG. 1 depicts a block diagram of a network of data processing systems in accordance with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The illustrative embodiments are related to systems and methods for selecting a principal predictive model for a sensor system. The sensor system may be a physical system comprising a sensor array configured to measure raw data for an alert mechanism that is adapted to providing an early alert about a failing parameter of the sensor system. The sensor system may be a system for product manufacturing, medical testing, physical/biological/chemical quality analyses, product authenticity and combinations thereof.

The illustrative embodiments recognize that in many systems, a common assessment of predictive power for a classical linear regression model is the square population cross-validated multiple correlation (SCVC). The SCVC may be used for discriminating or ranking models selected from a pool of candidate models on the basis of their prediction capabilities. Models associated with larger SCVC values have higher predictive power and may be desired. Formally, the (sample) SCVC of an estimated or fitted regression equation with coefficient vector estimate $\hat{\beta}$, is an unknown constant parameter denoted by $$\rho_c^2(\hat{\beta}).$$

It is a realized value of a random parameter which is the population SCVC. Methods for estimating $$\rho_c^2(\hat{\beta})$$

exist. However, a maximum achievable value is the square population multiple correlation, $\rho^2$, which is an unknown parameter. Therefore, it may be difficult to assess the magnitude $$\rho_c^2(\hat{\beta})$$

relative to $\rho^2$ without knowledge of $\rho^2$. For example, when a final model is built through a model selection process using the SCVC as the selection criterion the final model's (estimated) SCVC may be devoid of information about its magnitude relative to $\rho^2$. It may only suggest that the final model has the largest SCVC among a pool of candidate models. Consequently, it may be challenging to accurately assess the model predictive power on the basis of the magnitude of its estimated SCVC alone. Any careless assessment may yield wrong decisions whereby a moderately small SCVC is misinterpreted as a low predictive power and a moderately large SCVC is mistaken for a high predictive power.

In embodiments herein, applications of the system generate a goodness of prediction assessment to supplement a square cross-validated correlation (SCVC) of an estimated linear regression equation. More particularly, embodiments utilize the SCVC as a model selection criterion to choose the best predictive linear model from a pool of candidate models and employ the goodness of prediction assessment to appraise the predictive power of the final predictive linear model for potential deployment. The goodness of prediction assessment is an estimator of the proportional loss in predictive power (PLPP) the estimated linear regression induces when the estimated linear regression, rather than the true model, is used to make predictions over new samples. Further, and equivalently, a complement statistic, 1−PLPP, assesses the magnitude of the estimated linear regression model SCVC relative to its maximum achievable value, the unknown square population multiple correlation.

In embodiments, a system includes a sensor array includes a plurality of sensors. The system also includes a processor configured to extract raw data from a sensor array of the system, obtain a pool of predictive models, and for each predictive model of the plurality of predictive models, generate a square cross-validated correlation (SCVC) using the raw data as predictors. For a principal predictive model with the highest SCVC, the processor of the system is configured to generate a proportional loss in predictive power (PLPP), and responsive to the PLPP meeting a predetermined pass criteria, deploy the principal predictive model to provide an early alert about a failing parameter of the system when new raw data is generated by the sensor array.

In embodiments, the sensor array comprises dedicated sensors in a manufacturing system or other target physical system configured to accurately measure physical, biological or chemical properties of materials (such as raw materials or the ambient environment, including, for example, mass, weight, chemical composition, equipment information, etc.) which may be used in modeling an alarm system to provide an early alert about a failing parameter related to the system (such as a predicted viscosity or water content of a final product being too low). The sensors are not generic computers and produce measurements as raw data. Measurements as used herein generally refer to raw data that are precise and accurate values that cannot be obtained with the eye or mind (such as in a gauging or estimation process) but can rather be obtained through the use of the special purpose sensors or measurement tools configured for accurate and precise quantification. By obtaining a plurality of predictive models, the measured raw data may be used to assess corresponding SCVCs and PLPPs of the predictive models, which in conjunction aid to select a principal/optimal model for accurate alerts on new raw data.

In one embodiment, certain operations are described as occurring at a certain component or location. Such locality of operations is not intended to be limiting. Any operation described herein as occurring at or performed by a particular component, can be implemented in such a manner that one component-specific function causes an operation to occur, or be performed, at another component, e.g., at a local or remote engine, respectively. In one embodiment, the method described herein, is implemented to execute on a particularly configured computing device or data processing system and provides substantial advancement of the functionality of that computing device or data processing system. Embodiments thus have the capacity to improve the technical field of performance monitoring and alert systems using measure raw data from a sensor array. For example, as opposed to performing a plurality of computations on a generic standalone computer, the illustrative embodiments can utilize collective decision making in a monitoring/alert system to manage thousands of raw data measurements from a plurality of sensors in real-time with a careful observation and methodology, wherein a goodness of prediction quality optimizes performance of the alert system through automatically and dynamically generating and testing the performance of predictive alerting models. In an example, in response to a challenger model performing better than a principal model, the challenger model is used to replace the principal model for alerts.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably processed manually by a human user.

The illustrative embodiments are described with respect to certain types of machines. The illustrative embodiments are also described with respect to other scenes, subjects, measurements, devices, data processing systems, environments, components, and applications, by way of example only. Any specific manifestations of these and other similar artifacts are not intended to be limiting to the disclosure.

Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific surveys, code, hardware, algorithms, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures, therefore, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Figure 2:
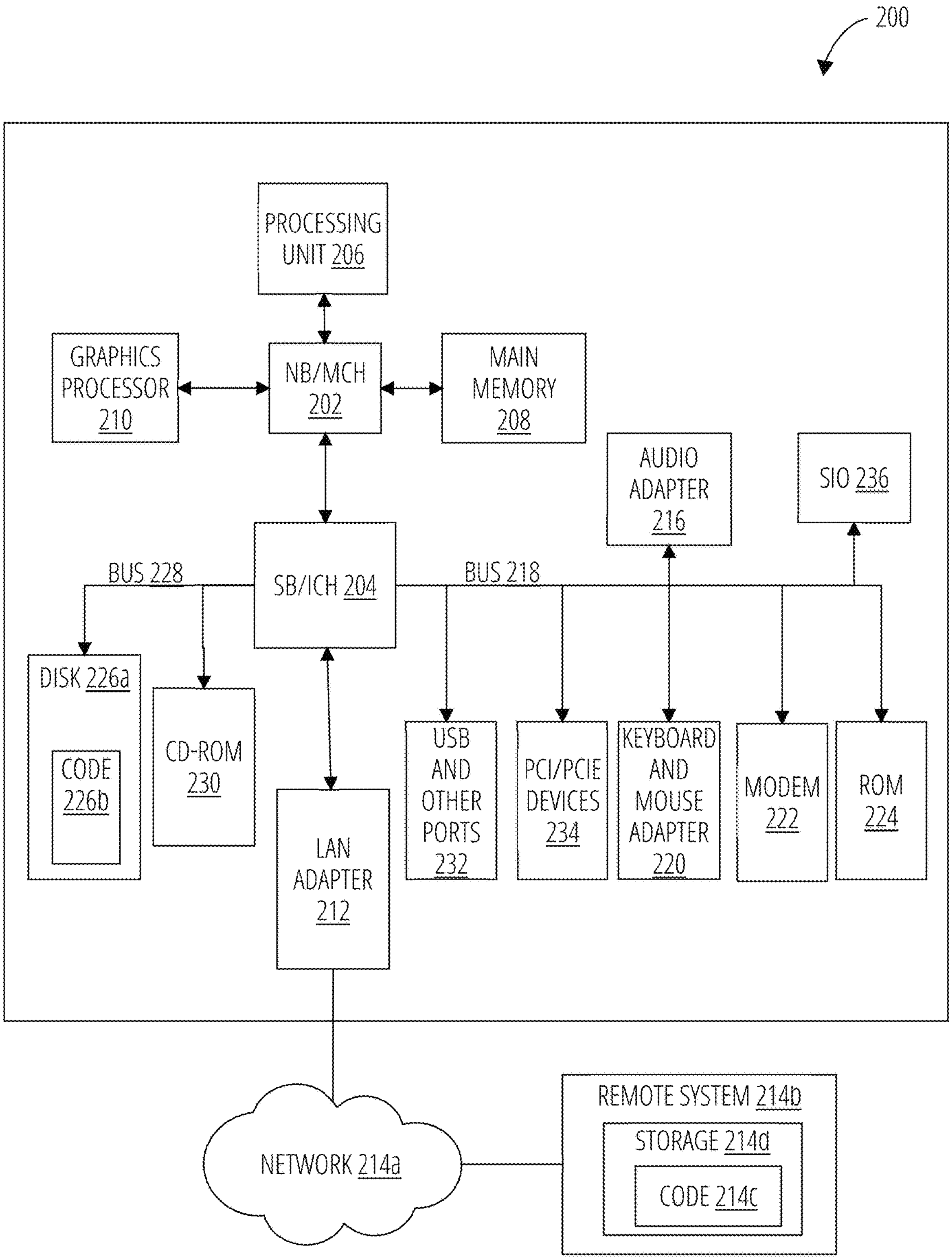
FIG. 2 depicts a block diagram of a data processing system in accordance with an illustrative embodiment.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above With reference to the figures and in particular with reference to FIG. 1 and FIG. 2, these figures are example diagrams of data processing environments in which illustrative embodiments may be implemented. FIG. 1 and FIG. 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing or sensor systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Client 110, client 112, client 114 are also coupled to network 102. A data processing system, such as server 104 or server 106, or clients (client 110, client 112, client 114) may contain data and may have software applications or software tools executing thereon. Server 104 may include one or more GPUs (graphics processing units) for training one or more models.

Only as an example, and without implying any limitation to such architecture, FIG. 1 depicts certain components that are usable in an example implementation of an embodiment. For example, servers and clients are only examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems (server 104, server 106, client 110, client 112, client 114) also represent example nodes in a cluster, partitions, and other configurations suitable for implementing an embodiment.

Device 120 is an example of a device described herein. For example, device 120 can take the form of a smartphone, a special purpose fabrication platform, a tablet computer, a laptop computer, client 110 in a stationary or a portable form, a wearable computing device, or any other suitable device. Any software application described as executing in another data processing system in FIG. 1 can be configured to execute in device 120 in a similar manner. Any data or information stored or produced in another data processing system in FIG. 1 can be configured to be stored or produced in device 120 in a similar manner.

Predictive power evaluation engine 128 may execute as part of predictive power evaluation system 124, or on any data processing system herein. Predictive power evaluation engine 128 may also execute as a cloud service communicatively coupled to system services, hardware resources, or software elements described herein. Predictive power evaluation engine 128 may be operable to extract raw data generated by the sensor array for use in generating a principal predictive model configured to provide an early alert about a failing parameter of a system. Database 118 of storage unit 108 stores one or more measurements or data from a sensor or sensor array in repositories for computations herein.

Server application 116 implements an embodiment described herein. Server application 116 can use data from storage unit 108 for computations herein. Server application 116 can also obtain data from any client for computations. Server application 116 can also execute in any of data processing systems (server 104 or server 106, client 110, client 112, client 114), such as client application 122 in client 110 and need not execute in the same system as server 104.

Server 104, server 106, storage unit 108, client 110, client 112, client 114, device 120 may couple to network 102 using wired connections, wireless communication protocols, or other suitable data connectivity. Client 110, client 112 and client 114 may be, for example, personal computers or network computers.

In the depicted example, server 104 may provide data, such as boot files, operating system images, and applications to client 110, client 112, and client 114. Client 110, client 112 and client 114 may be clients to server 104 in this example. Client 110, client 112 and client 114 or some combination thereof, may include their own data, boot files, operating system images, and applications. Data processing environment 100 may include additional servers, clients, and other devices that are not shown. Server 104 includes a server application 116 that may be configured to implement one or more of the functions described herein in accordance with one or more embodiments. Server 106 may include a configuration to aggregate sensor measurements for storage in database 118. An operator of the predictive power evaluation system 124 can include individuals, computer applications, and electronic devices. The operators may employ the predictive power evaluation engine 128 of the predictive power evaluation system 124 to make predictions or decisions about a failing parameter. An operator may desire that the predictive power evaluation engine 128 perform methods to satisfy a predetermined evaluation criteria.

The data processing environment 100 may also be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as server 104, server 106, client 110, client 112, client 114, device 120, or predictive power evaluation system 124 in FIG. 1, or another type of device in which computer usable program code or instructions implementing the processes may be located for the illustrative embodiments.

Data processing system 200 is also representative of a data processing system or a configuration therein in which computer usable program code or instructions implementing the processes of the illustrative embodiments may be located. Data processing system 200 is described as a computer only as an example, without being limited thereto. Implementations in the form of other devices, such as device 120 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to North Bridge and memory controller hub (NB/MCH) 202 through an accelerated graphics port (AGP) in certain implementations.

In the depicted example, local area network (LAN) adapter 212 is coupled to South Bridge and input/output (I/O) controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and input/output (I/O) controller hub (SB/ICH) 204 through bus 218. Hard disk drive (HDD) or solid-state drive (SSD) **226*a* and CD-ROM 230 are coupled to South Bridge and input/output (I/O) controller hub (SB/ICH) 204 through bus 228. PCI/PCIe devices 234 may include, for example, Ethernet adapters, add-in cards, and PC cards for notebook computers. PCI uses a card bus controller, while PCIe does not. Read only memory (ROM) 224 may be, for example, a flash binary input/output system (BIOS). Hard disk drive (HDD) or solid-state drive (SSD) 226*a* and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and input/output (I/O) controller hub (SB/ICH) 204 through bus 218**.

Memories, such as main memory 208, read only memory (ROM) 224, or flash memory (not shown), are some examples of computer usable storage devices. Hard disk drive (HDD) or solid-state drive (SSD) **226*a*, CD-ROM 230**, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as server application 116 and client application 122 in FIG. 1, are located on storage devices, such as in the form of codes **226*b* on Hard disk drive (HDD) or solid-state drive (SSD) 226*a*, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory (ROM) 224**, or in one or more peripheral devices.

Furthermore, in one case, code 226*b* may be downloaded over network 214*a* from remote system 214*b*, where similar code 214*c* is stored on a storage device 214*d* in another case, code 226*b* may be downloaded over network 214*a* to remote system 214*b*, where downloaded code 214*c* is stored on a storage device 214*d*.

The hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub (NB/MCH) 202. A processing unit may include one or more processors or CPUs.

The depicted examples in FIG. 1 and FIG. 2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and Hard disk drive (HDD) or solid-state drive (SSD) 226*a* is manifested as a virtualized instance of all or some portion of Hard disk drive (HDD) or solid-state drive (SSD) 226*a* that may be available in the host data processing system. The host data processing system in such cases is represented by data processing system 200.

Figure 3:
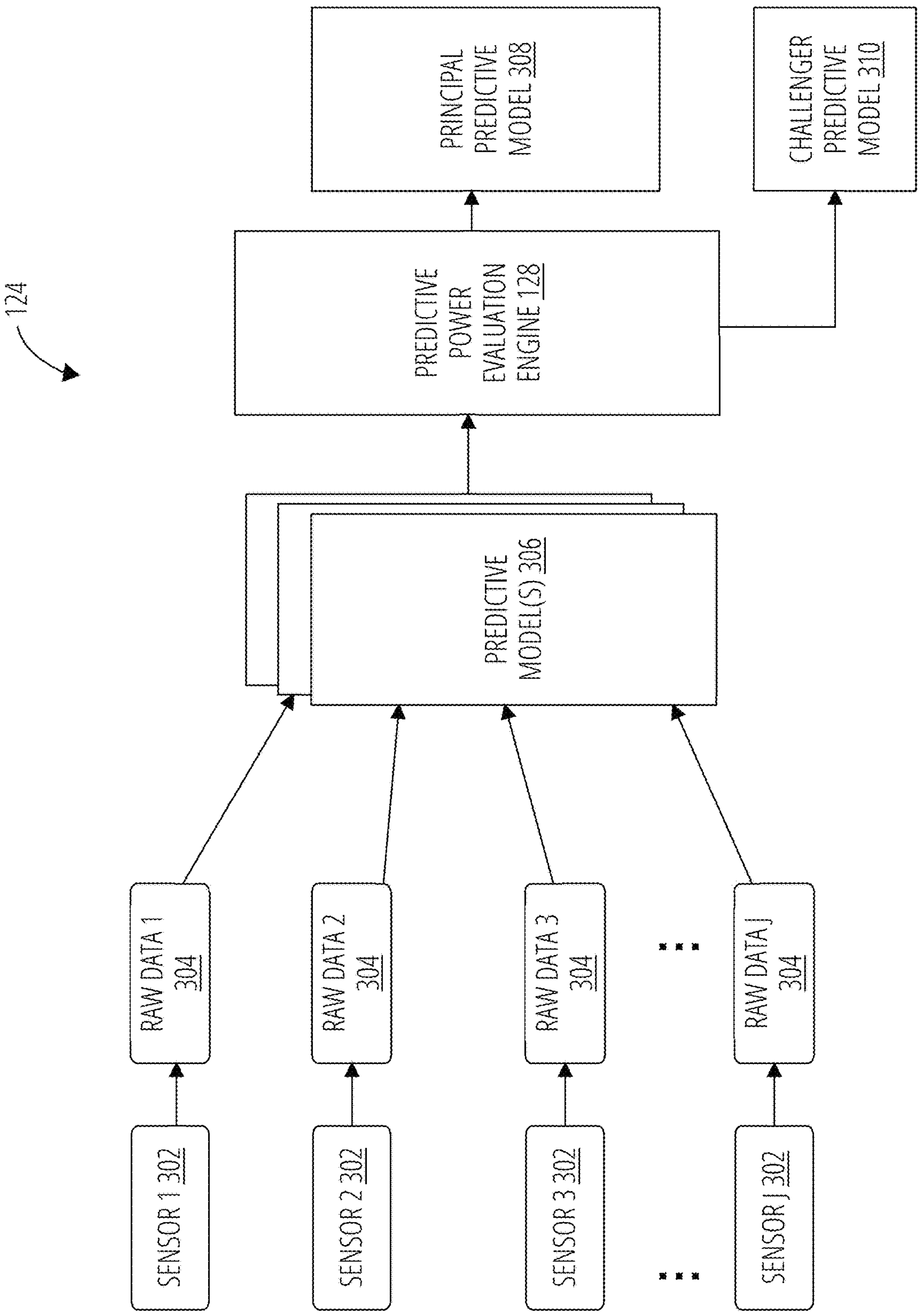
FIG. 3 depicts a block diagram of a predictive power evaluation system in accordance with an illustrative embodiment.

Turning now to FIG. 3, a block diagram of a predictive power evaluation system 124 for generating a principal predictive model 308 is disclosed. The principal predictive model 308 may be generated for a process such as a product manufacturing process, a medical testing process, a physical/biological/chemical quality analysis process, a product authenticity process, other similar processes involving the use of a sensors to measure and obtain raw data, and combinations thereof.

FIG. 3 is described in conjunction with an example product manufacturing process that involve batch manufacturing and is not meant to be limiting as other examples may be obtained in view of the descriptions herein. Batch manufacturing may be considered as the process of manufacturing that takes raw materials and uses a formula or recipe to combine and refine the raw materials by flowing through a process that results in a final product. Examples of materials made through batch manufacturing include food and beverage products, pharmaceuticals, and chemicals. Batch manufacturing can be contrasted with discrete manufacturing where distinct, countable parts are made and often assembled together into a final product.

In the manufacturing process, final products may be manufactured in batches. Samples are taken from each batch and properties of the final products measured to obtain raw data about whether the final product conforms to specification. For example, in the manufacture of asphalt, raw materials include aggregates such as gravel, slag, rock, or recycled material. The materials go through several process steps, including cooling, heating, and mixing, according to a recipe. Environmental measurements during the processing of the raw materials such as temperature and humidity, process measurements related to the raw materials such as line speed and pressure, direct physical, chemical or biological measures of raw material measurements such as weight, and chemical composition are taken by sensors 302 of the sensor array 126 as raw data 304 while each batch moves through the process steps.

Following the manufacturing process, samples from each batch may be used for further measurements to determine actual final specifications such as a final viscosity or water content of the final product. With such traceability, predictive models 306 can be generated and a goodness of prediction of the predictive models assessed to provide a principal predictive model 308 and/or challenger predictive models 310 that can be used to generate an early alert that a metric of a final product is likely to be out of specification based on current process conditions.

More specifically, the predictive models 306, which can be regression models, can take measurements from a quality assessment of the final products and use previously collected measurements related to the raw materials that were used to produce the final products as the predictors. Along with generating a squared cross-validated correlation (SCVC), a proportional loss in predictive power (PLPP), described in more detail herein, is also generated by the predictive power evaluation engine 128 to provide a complete and accurate assessment of the prediction capability of the resulting predictive models 306. In the asphalt manufacturing example, input variables related to raw materials, such as quantity, flow, pH, temperature and pressure all potentially have an impact on the viscosity of the final product. By tracking these process inputs, it is possible to predict in advance that the viscosity of the final product is likely to fall out of specification and make adjustments before such defects occur.

For a given predictive model 306, the PLPP measures the loss in predictive power the predictive model 306 induces when the predictive model 306, rather than a true regression model is used to make predictions over new observations. Equivalently the complement RCSCV (which is 1−PLPP), assesses a magnitude of the SCVC relative to its unknown maximum achievable value, the square population multiple correlation ($\rho^2$). Thus, the PLPP is a useful metric for assessing the deployment worthiness after the SCVC of a predictive model 306 has been estimated. A low PLPP suggests that the estimated predictive model 306 induces a low loss in predictive power when the predictive model 306, rather than the true model is used to make predictions on new data. In other words, the SCVC is large relative to its maximum possible value so that the estimated predictive model 306 captures the underlying patterns in the data well and can make accurate predictions on new data. When comparing multiple predictive model 306, the PLPP of the predictive model 306 with the highest SCVC is estimated to see if that predictive model 306 can be generalized to new samples. Table 1 provides rough guidelines for classifying the magnitude of the SCVC relative to its maximum possible value $\rho^2$, based on the magnitude of the PLPP of a linear regression model.

Table 1. Rough guidelines for classifying the magnitude of the SCVC relative to its maximum possible value, $\rho^2$, based on the magnitude of the PLPP or RSCVC of a linear regression model.

| PLPP | RSCVC | Magnitude of SCVC relative to $\rho^2$ |
|---|---|---|
| $0.5 \le \delta_c(\hat{\beta}) < 1.0$ | $0 < 1 - \delta_c(\hat{\beta}) \le 0.5$ | Small |
| $0.3 \le \delta_c(\hat{\beta}) < 0.5$ | $0.5 < 1 - \delta_c(\hat{\beta}) \le 0.7$ | Moderately small |
| $0.2 \le \delta_c(\hat{\beta}) < 0.3$ | $0.7 < 1 - \delta_c(\hat{\beta}) \le 0.8$ | Moderately large |
| $0.1 \le \delta_c(\hat{\beta}) < 0.2$ | $0.8 < 1 - \delta_c(\hat{\beta}) \le 0.9$ | Large |
| $0 \le \delta_c(\hat{\beta}) < 0.1$ | $0.9 < 1 - \delta_c(\hat{\beta}) \le 1$ | Very Large |

In an illustrative embodiment, principal predictive model 308 is the current best-performing model, selected using the SCVC as the discriminating criteria in a forward selection process. Models with higher SCVC values are preferred. Challenger predictive models 310 may be competing models. Each challenger predictive model 310 may have the same response variable as the principal predictive model 308. However, challenger predictive models 310 can have different predictors. The challenger predictive model 310 that generates the best results in the predictive power evaluation system 124 can become the new principal predictive model 308 if promoted. In essence, each SCVC estimate can be followed by a corresponding PLPP estimate to determine if the predictive model 306 is worth deploying.

For example, using a model for raw data 304 about asphalt, a principal predictive model 308 was generated to be two-predictor model with an estimated SCVC value of 0.2635, a first challenger predictive model (Challenger 1) was a 3-predictor model with an estimated SCVC value of 0.2441, and a second challenger predictive model (Challenger 2) was a 4-predictor model with an estimated SCVC value of 0.2400. In addition, the estimated PLPP of the principal predictive model was 0.0217 indicating that there is only about a 2.2% loss in predictive power when the principal predictive model, rather than the corresponding true model, is used to make predictions. Therefore, the principal predictive model 308 of the predictive power evaluation systems 124 is deployable. Similarly, the PLPP of the challenger predictive models were 0.0457 and 0.0669 respectively so that there are only about 4.6% and 6.7% losses in predictive powers when the challenger predictive models are used in new samples to make predictions. Thus, the challenger predictive models may in some cases be deployable as well.

In illustrative embodiments, once a principal predictive model 308 is deployed into production, it may be monitored to detect when conditions have changed such that an update to the existing model can be performed. To that end, the principal predictive model and challenger predictive models can be refit with the latest data on a scheduled basis in the predictive power evaluation system 124 or data processing environment 100 (e.g. a manufacturing plant or a regulatory system), such as once per week or once per month. Measures of predictive power including the SCVC and PLPP are then computed. First, the SCVC for the principal predictive model 308 and challenger predictive models 310 are estimated using the latest raw data 304. The estimated SCVCs are then compared to determine whether any challenger model has better SCVC estimate than the principal predictive model 308. In addition, the PLPP of the models are examined to determine if they maintain their respective deployable status. Over time, models with consistently low SCVC and high PLPP might need adjustment or redevelopment.

Figure 4:
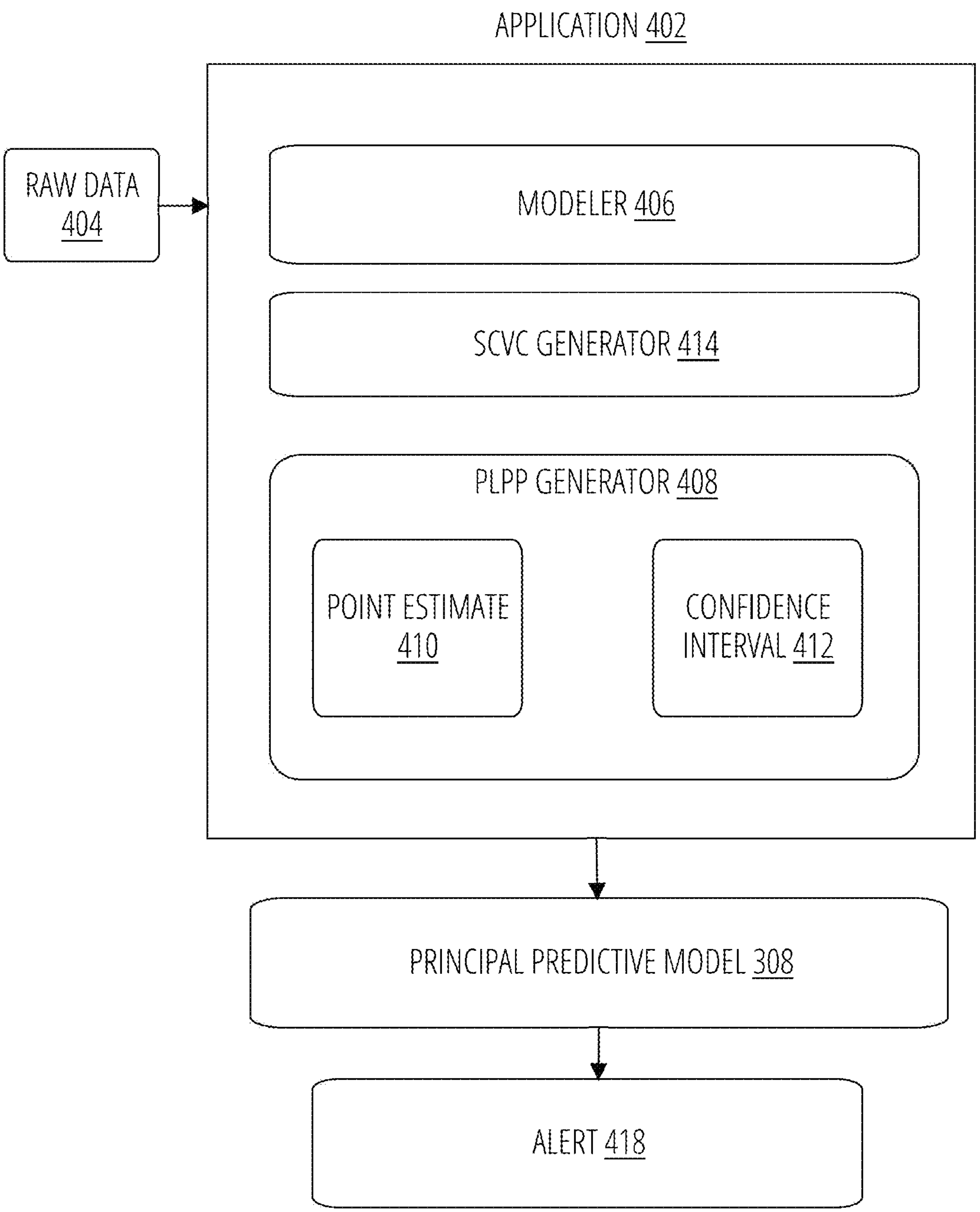
FIG. 4 depicts a block diagram of an application in accordance with an illustrative embodiment.

FIG. 4 illustrates an application 402 for generating alerts 418 in a predictive power evaluation system 124. The application receives or extracts or generates raw data 304 from or using on the sensor array 126. The application 402 obtains a pool of predictive models 306 for modeling by the modeler 406. For each predictive model 306 of the pool of predictive models, the application 402 generates, by the SCVC generator 414, a square cross-validated correlation (SCVC) using the raw data as predictors. For a principal predictive model 308 with the highest SCVC, the application 402 generates, by the PLPP generator 408, a proportional loss in predictive power (PLPP). Responsive to the PLPP meeting a predetermined pass criteria (such as being in a predetermined range) the application 402 deploys the principal predictive model 308 to provide an early alert 418 about a failing parameter of the system when new raw data is generated by the sensor array 126.

Figure 5:
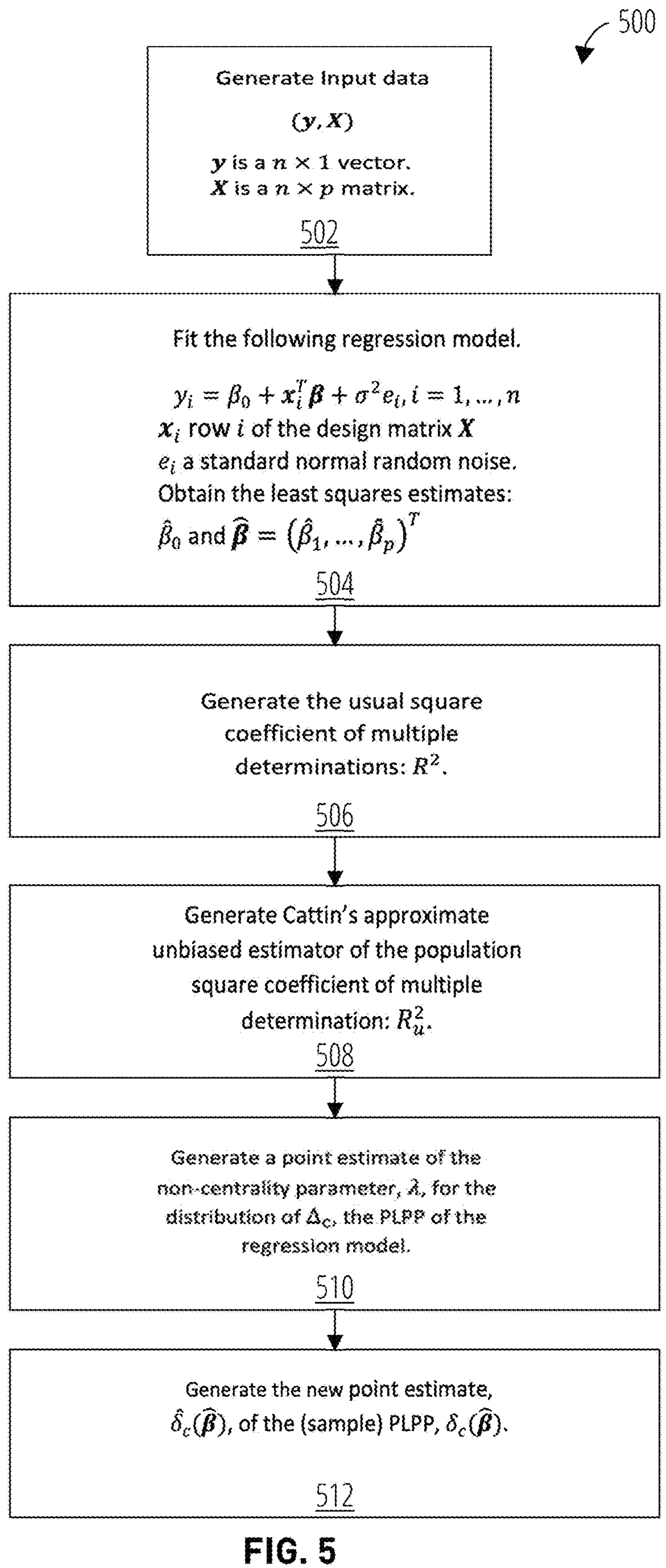
FIG. 5 depicts a flowchart illustrating a generation a proportional loss in predictive power in accordance with an illustrative embodiment.
Figure 6:
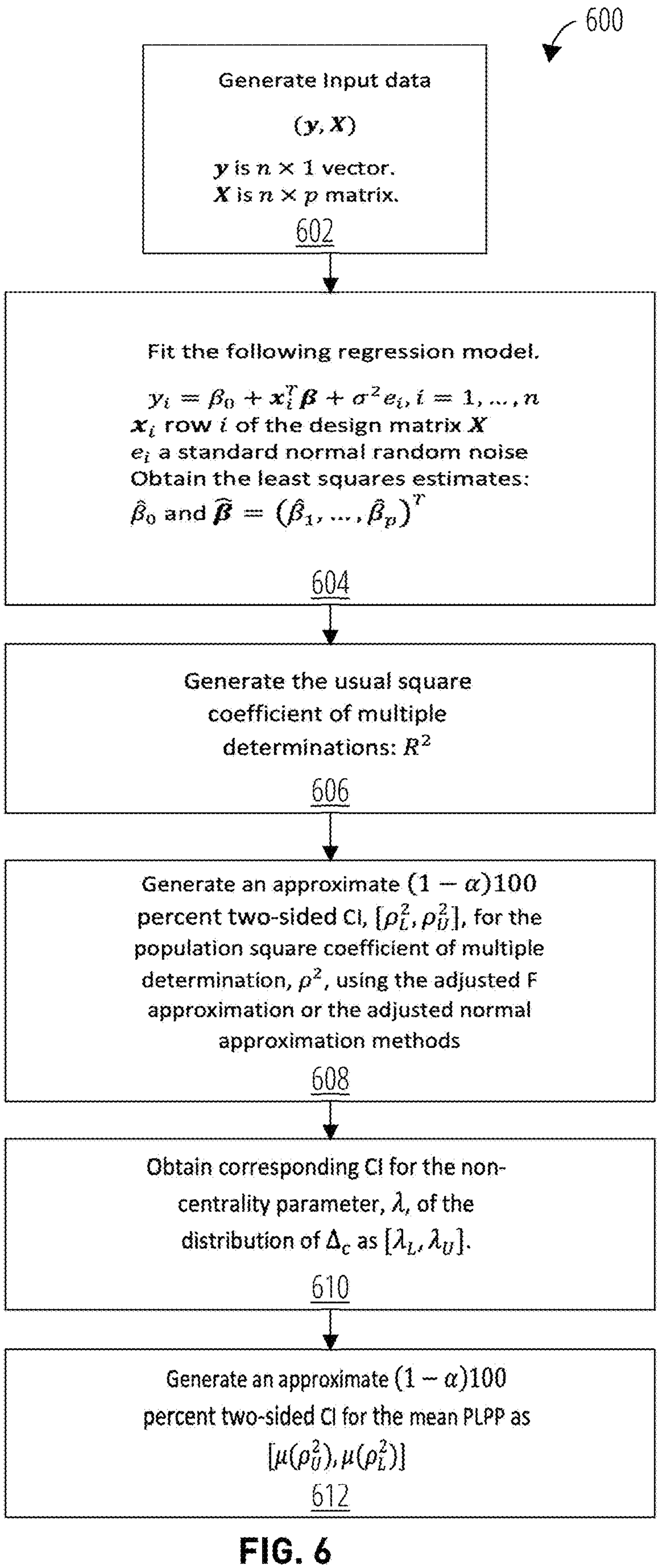
FIG. 6 depicts a flowchart illustrating a generation a proportional loss in predictive power in accordance with an illustrative embodiment.

The PLPP generator 408 can generate the PLPP as a point estimate 410 as illustrated in FIG. 5. The PLPP generator 408 can also or alternatively generate the PLPP as a confidence interval 412, as shown in FIG. 6.

FIG. 5 is a flowchart illustrating a routine for generating the PLPP as a point estimate. Firstly, as discussed earlier, the generation of the PLPP may be performed after generating the SCVC. The SCVC is a common assessment of predictive power for a classical linear regression model. The SCVC can be used for ranking models on the basis of their prediction capabilities. Models associated with larger SCVC values have higher predictive power and may be desired. Formally, the (sample) SCVC of an estimated or fitted regression equation with coefficient vector estimate $\hat{\beta}$, is an unknown constant parameter denoted by $$\rho_c^2(\hat{\beta}).$$

It is a realized value of a random parameter which is the population SCVC. Methods for estimating $$\rho_c^2(\hat{\beta})$$

exist. However, a maximum achievable value is the square population multiple correlation, $\rho^2$, which is an unknown parameter. Therefore, it may be difficult to assess the magnitude $$\rho_c^2(\hat{\beta})$$

relative to $\rho^2$ without knowledge of $\rho^2$. For example, when a final model is built through a model selection process using the SCVC as the selection criterion the final model's (estimated) SCVC may be devoid of information about its magnitude relative to $\rho^2$. It may only suggest that the final model has the largest SCVC among a pool of candidate models. Consequently, the predictive power of models can be assessed not only on the basis of the magnitude of its estimated SCVC but in conjunction with the PLPP.

A common practice to assessing the closeness of $$\rho_c^2(\hat{\beta})$$

to its maximum achievable value $\rho^2$ is to calculate the amount of shrinkage of the sample coefficient of determination, $R^2$, relative to $R^2$. Typically, when the estimated regression equation is used to make predictions over new samples the sample coefficient of determination shrinks to the estimated sample SCVC, $$\hat{\rho}_c^2(\hat{\beta}).$$

The amount of shrinkage of $R^2$ relative to $R^2$ or the proportional shrinkage of $R^2$ is therefore obtained as $$\left[R^2 - \hat{\rho}_c^2(\hat{\beta})\right]/R^2 = 1 - \hat{\rho}_c^2(\hat{\beta})/R^2.$$

Similarly, the estimated regression equation induces a loss in predictive power when it, rather than the true regression equation, is used to make predictions over new samples. In other words, the population coefficient of determination, $\rho^2$, shrinks to become $$\rho_c^2(\hat{\beta})$$

when the estimated regression equation is used to make prediction over new samples. The amount of loss in predictive power relative to $\rho^2$ or the proportional loss in predictive power (PLPP) associated with the estimated regression equation is given by $$\delta_c(\hat{\beta}) - 1 - \rho_c^2(\hat{\beta})/\rho^2.$$

Thus, the method of assessing the closeness of $$\rho_c^2(\hat{\beta})$$

to $\rho^2$ (or assessing the magnitude of $$\rho_c^2(\hat{\beta})$$

relative to $\rho^2$) using the proportional shrinkage of $R^2$ is equivalent to estimating the sample $$PLPP,\ \delta_c(\hat{\beta}) = 1 - \rho_c^2(\hat{\beta})/\rho^2, \text{ with } 1 - \hat{\rho}_c^2(\hat{\beta})/R^2.$$

Irrespective of the method for estimation of $$\rho_c^2(\hat{\beta}),$$

however, a limitation of $R^2$: the proportional shrinkage of approach is a gross overestimation of the sample PLPP, to some extent, due to $R^2$ always overestimating $\rho^2$. Specifically, simulation results reveal that the proportional shrinkage of $R^2$ severely overestimates the PLPP for regression samples drawn from population with small $\rho^2$ values ($\rho^2<0.5$) or for small and moderate regression samples where the ratio of the sample size to the number of predictors is small or moderate. As a result of this overestimation, a fitted regression equation with a low PLPP (or equivalently large SCVC relative to $\rho^2$) will be misinterpreted as having a large PLPP (or equivalently small SCVC relative to $\rho^2$) and therefore would not be deployed by mistake. Such misleading results may have tremendous consequences. Since in most meaningful practical applications the magnitude of $\rho^2$ is not known these results suggest that $R^2$, the proportional shrinkage method for estimating the PLPP or equivalently for estimating the magnitude of the SCVC relative to its maximum possible value, $\rho^2$, may be discontinued.

However, based on the same definitions and notations, the sample PLPP of an estimated regression equation with coefficient vector estimate $\hat{\beta}$ is given by $$\delta_c(\hat{\beta}) = 1 - \rho_c^2(\hat{\beta})/\rho^2.$$

This assesses the closeness of the sample SCVC, $$\rho_c^2(\hat{\beta}),$$

to its maximum achievable value, $\rho^2$. Thus, a small value of the PLPP close to 0 indicates that there may only be a little loss in predictive power when the estimated regression equation, instead of the true regression equation, is used to make predictions over new samples. A large value of the PLPP close to 1, on the other hand, can indicate that the estimated regression model causes a great loss in prediction power when it is used, in place of the true equation, to make predictions over new samples.

An alternative but directly equivalent measure to the PLPP is the RSCVC, the ratio of the SCVC to $\rho^2$ given by $$\rho_c^2(\hat{\beta})/\rho^2.$$

The RSCV assesses the magnitude of $$\rho_c^2(\hat{\beta})$$

relative to $\rho^2$, and can be expressed in terms of the PLPP as RSCVC=1−PLPP. As a result, the PLPP and RSCVC have the same statistical properties. In embodiments, interpreting a large value of a statistic as a positive outcome may utilize the RSCVC to measure the closeness of the SCVC to $\rho^2$. Specifically, if an estimated regression equation RSCVC is close to 1 (SCVC is close to $\rho^2$) then the SCVC is large relative to $\rho^2$; on the other hand, if the RSCVC is close to 0 then SCVC is small compared to $\rho^2$.

The population PLPP is a random parameter whose distribution can be expressed in terms noncentral beta distributions. A new point estimator of sample PLPP, $\delta_c(\hat{\beta})$, derived from the mean of the distribution of the population PLPP is provided. In addition, an algorithm for finding a confidence interval for the average PLPP for a given fitted regression equation is also provided.

Estimation of the PLPP for an Estimated Regression Equation

For a given estimated regression equation with coefficient estimates $\hat{\beta}$, an analytical point estimator for $\delta_c(\hat{\beta})$ is provided and standard error of estimates derived herein. A confidence interval method for the average of $\Delta_c$ (the mean population PLPP) is also provided. These methods are based upon the mean of the distribution of $\Delta_c$. The exact mean of $\Delta_c$, however, has an opened expression that involves infinite power series. Fortunately, the exact statistical mean is optional for estimation purposes. Typically, a first or second order approximation of the exact mean is suitable. For example, Browne (1975) estimator is derived from a first order approximation of the mean of the population SCVC. Similarly, a point estimator of a regression sample PLPP can be derived from a first order approximation of the exact mean. Confidence intervals, however, can be derived from a second order approximation of the exact mean to improve on accuracy of the intervals.

A First and Second Order Approximation of the Population Mean PLPP

By the δ-method, a first and second order approximations for the mean of the ratio of two random variables, U and V, are given as follows:

$$E\left(\frac{U}{V}\right) \cong \frac{E(U)}{E(V)} \text{ and } E\left(\frac{U}{V}\right) \cong \frac{E(U)}{E(V)}\left(1 + \frac{\mathrm{Var}(V)}{E(V)^2} - \frac{\mathrm{Cov}(U, V)}{E(U)E(V)}\right).$$

This result is obtained by taking the expectation of the second order Taylor expansion of the function g(U, V)=U/V about the point [E(U), E(V)]. In addition, the distribution of $\Delta_c$ can be expressed in terms of independents noncentral chi square and central chi square distribution as follows:

$$\Delta_c = \frac{Y_2}{Y_1 + Y_2},$$

where $$Y_1 \sim \mathcal{X}^2_{1,\lambda}$$

independent of $$Y_2 \sim \mathcal{X}^2_{p-1}.$$

Letting U=$_2$ and V=$Y_1+Y_2$, yields the following:

$$E(U) = p - 1,\ E(V) = \lambda + p,\ \mathrm{Var}(V) = 2(2\lambda + p),$$
$$\mathrm{Cov}(U, V) = \mathrm{Var}(Y_2) = 2(p - 1).$$

Thus, first order approximation of the mean PLPP is as follows:

$$\tilde{\mu}_1(\rho^2, n, p) = \frac{p-1}{\lambda + p}.$$

The second order approximation is given as follows:

$$\tilde{\mu}_2(\rho^2, n, p) = \frac{p-1}{(\lambda + p)^3}\left[(\lambda + p)^2 + 2\lambda\right]$$

In the above, $\lambda=(n-p-2)\rho^2/(1-\rho^2)$. It can be easily shown that both $\tilde{\mu}_1$ and $\tilde{\mu}_2$ are monotone decreasing functions of $\rho^2$. Like the exact mean, they decrease from (p−1)/p to 0 as $\rho^2$ varies from 0 to 1. In addition, using the δ-method, an approximate variance of the aforementioned function g(U, V)=U/V is given as follows:

$$\mathrm{Var}\left(\frac{U}{V}\right) \cong \frac{E(U)^2}{E(V)^2}\left(\frac{\mathrm{Var}(U)}{E(U)^2} + \frac{\mathrm{Var}(V)}{E(V)^2} - 2\frac{\mathrm{Cov}(U, V)}{E(U)E(V)}\right).$$

As before, by letting $U=Y_2$ and $V=Y_1+Y_2$, and using the fact that $Y_1$ and $Y_2$ are independent it can be obtained that E(U)=p−1 E(V)=λ+p, Var(V)=2(2λ+p), Cov(U, V)=Var(U)=Var($Y_2$)=2(p−1). After some algebra, an approximate variance for the distribution of $\Delta_c$ is given by the following equation:

$$\tilde{\sigma}^2(\rho^2, n, p) = \frac{2(p-1)}{(\lambda + p)^4}\left[(\lambda + p)^2 - p(p-1)\right].$$

Taking the square root yields an approximate standard deviation of the distribution of $\Delta_c$ given as follows:

$$\tilde{\sigma}(\rho^2, n, p) = \frac{1}{(\lambda + p)^2}\sqrt{2(p-1)\left[(\lambda + p)^2 - p(p-1)\right]}$$

Point Estimation of a Regression Sample PLPP

For a given estimated regression equation or $\hat{\beta}$, Brown (1975) proposed an estimator of $$\rho_c^2(\hat{\beta})$$

derived from an estimate of the mean of the population square cross-validated correlation, $\mathscr{R}^2_{c}$. A similar approach can be used to derive a point estimator of $\delta_c(\hat{\beta})$ based on the mean of $\Delta_c$. For point estimation purposes a point estimator of $\delta_c(\hat{\beta})$ can be derived from a first order approximation of the mean of $\Delta_c$ because it involves a simple inverse function of the non-centrality parameter, $\lambda$. More specifically, a point estimator of $\delta_c(\hat{\beta})$ may be given by the following equation:

$$\hat{\delta}_c = \frac{p-1}{\hat{\lambda}+p} = \frac{(p-1)(1-R_u^2)}{(n-2p-2)R_u^2+p}$$

where $$\hat{\lambda} = \max[0, (n-p-2)R_u^2/(1-R_u^2)] \text{ and } R_u^2$$

is an approximate unbiased estimator for $\rho^2$ (Cattin, 1980). It is given as follows.

$$R_u^2 = 1 - \frac{(n-3)(1-R^2)}{n-p-1}\left[1 + \frac{2(1-R^2)}{n-p+1} + \frac{8(1-R^2)^2}{(n-p-1)(n-p+3)}\right]$$

where $R^2$ is the usual coefficient of determination or the sample square multiple correlation. The point estimate $$R_u^2$$

can be negative in some small samples designs where the population square correlation, $\rho^2$, is close to zero. When this occurs, the sample PLPP is estimated as its highest possible average value, (p−1)/p. An alternative estimator can be based on the adjusted $R^2$, we denote by $$R_a^2,$$

as opposed to $$R_u^2.$$

An expression of $$R_a^2$$

is:

$$R_a^2 = R^2 - \frac{p(1-R^2)}{n-p-1} = 1 - \frac{n-1}{n-p-1}(1-R^2)$$

From simulation studies, however, the estimator based on $$R_u^2$$

yields better results in small sample designs. In larger sample designs the two estimators yield essentially the same results.

In addition, a large sample approximate standard deviation of the estimator is given as follows:

$$\hat{se}(\hat{\delta}_c) = \frac{\hat{\delta}_c^2}{(p-1)}\sqrt{V_{\hat{\lambda}}},$$

where $$V_{\hat{\lambda}} = \frac{2}{(n-1)^2(n-p-5)}\left[(n-1)(2n-p-4)\hat{\lambda}^2 + 2k(n-1)(n-3)\hat{\lambda} + k^2(n-3)p\right]$$

In the above, k=n−p−2. The point estimate, $\hat{\delta}_c$, is guaranteed to be in the unit interval [0, 1) just like the true parameter, $\delta_c(\hat{\beta})$. In addition, a common conventional estimator of $\delta_c(\hat{\beta})$ is the proportional shrinkage of $R^2$ given by $$1 - \frac{\hat{\rho}_c^2(\hat{\beta})}{R^2}$$

where $$\hat{\rho}_c^2(\hat{\beta})$$

is an estimator of the sample SCVC, $$\rho_c^2(\hat{\beta}).$$

Data splitting cross-validation and analytical (formula-based) estimation methods for the sample SCVC, $$\rho_c^2(\hat{\beta}),$$

are available. Since the analytical estimation methods have been shown to be superior to data splitting methods, analytical methods can be considered. Among these analytical methods, Browne (1975) estimator is ideal. Thus, the first traditional estimator for $\delta_c(\hat{\beta})$ that may be considered is the proportional shrinkage of $R^2$ based on Browne SCVC estimator. The estimator is denoted by BRPS and is given as follows:

$$BRPS = 1 - \frac{\hat{\rho}_{cB}^2(\hat{\beta})}{R^2} \text{ where } \hat{\rho}_{cB}^2(\hat{\beta}) = \frac{(n-p-3)\hat{\rho}^4 + \hat{\rho}^2}{(n-2p-2)\hat{\rho}^2 + p},$$

$$\text{with } \hat{\rho}^2 = \max(0, R_a^2) \text{ and } \hat{\rho}^4 = \max\left[0, (\hat{\rho}^2)^2 - \frac{2p(1-\hat{\rho}^2)^2}{(n-1)(n-p+1)}\right].$$

The proportional shrinkage estimation method based on Lord (1950) and Nicholson (1960) estimator for $$\rho_c^2(\hat{\beta})$$

can be considered. This estimation method for $\delta_c(\hat{\beta})$ is considered primarily because sample size planning method, a so-called PEAR method, uses this particular proportional shrinkage form. Specifically, the proportional shrinkage of $R^2$ based on Lord and Nicholson estimator for $$\rho_c^2(\hat{\beta})$$

is given as follows:

$$LNPS = 1 - \frac{\hat{\rho}_{cLN}^2(\hat{\beta})}{R^2},$$

where Lord-Nicholson estimator of the sample SCVC is given $$\text{by } \hat{\rho}_{cLN}^2(\hat{\beta}) = 1 - \frac{(n+p+1)(n-1)}{n(n-p-1)}(1-R^2).$$

Accordingly, turning now to FIG. 5, a routine 500 for generating the point estimate 410 is shown. The routine 500 begins at block 502 wherein the input data is generated based on the raw data 304 from the sensor array 126. n is a sample size, and p is the number of predictors. In block 504, a regression model is fit, and a usual square coefficient of multiple determinations: $R^2$ is generated in block 506. More specifically, $$R^2 = 1 - \frac{SSE}{SST},\ SSE = \sum_{i=1}^{n}(y_i - \hat{y}_i)^2,\ SST = \sum_{i=1}^{n}(y_i - \bar{y})^2.$$

In block 508, Cattin's approximate unbiased estimator of the population square coefficient of multiple determination:

$$R_u^2$$

is generated. More specifically, $$R_u^2 = 1 - \frac{(n-3)(1-R^2)}{n-p-1}\left[1 + \frac{2(1-R^2)}{n-p-1} + \frac{8(1-R^2)^2}{(n-p-1)(n-p+3)}\right].$$

In block 510, a point estimate of the non-centrality parameter, $\lambda$, for the distribution of $\Delta_c$, the PLPP of the square population correlation is generated:

$$\hat{\lambda} = \max\left[0, (n-p-2)R_u^2/(1-R_u^2)\right].$$

In block 512, the new point estimate, $\hat{\delta}_c(\hat{\beta})$, of the (sample) PLPP, $\delta_c(\hat{\beta})$ is generated. More specifically, $$\hat{\delta}_c(\hat{\beta}) = \frac{p-1}{\hat{\lambda}+p}.$$

FIG. 6 is a flowchart illustrating a routine 600 for generating the PLPP as a confidence interval 412 in accordance with an illustrative embodiment.

A CI for the Mean PLPP

Firstly, for a given estimated regression equation or $\hat{\beta}$, an approximate confidence interval (CI) for the unknown mean population PLPP value may be proposed. The CI can be derived from the monotonicity of the mean, $\mu(\rho^2, n, p)$ as a function of $\rho^2$. More specifically, for fixed n and p, the mean of $\mu(\rho^2, n, p)$ is a monotone decreasing function of $\rho^2$. Therefore, if the interval $$(\rho_L^2, \rho_U^2)$$

is a two-sided 100(1−α) percent CI for $\rho^2$ then $$[\mu(\rho_U^2, n, p), \mu(\rho_L^2, n, p)]$$

is also a two-sided 100(1−α) percent CI for $\mu(\rho^2,n,p)$. For most practical purposes, $$[\mu(\rho_U^2, n, p), \mu(\rho_L^2, n, p)]$$

may also be replaced with $$[\tilde{\mu}_2(\rho_U^2, n, p), \tilde{\mu}_2(\rho_L^2, n, p)],$$

where $\tilde{\mu}_2(\rho^2,n,p)$ is the second order approximation of $\mu(\rho^2,n,p)$ as derived earlier. In this case, the second order approximation (as opposed to the first order approximation) may be used because it yields better CIs in small sample designs.

Moreover, approximate CIs for $\rho^2$ (for sufficiently large samples) are available. These CIs, such as the so-called Helland or Banger and Pammer normal approximation methods can be very sensitive to the normal assumption under which they are derived. Thus, CI methods such as the so-called adjusted F approximation method and adjusted normal approximation method can be used wherein, for a given regression sample with coefficient vector estimate $\hat{\beta}$, an approximate two-sided 100(1−α) percent CI for the mean PLPP can be obtained by firstly generating a two-sided 100(1−α) percent CI for $\rho^2$ using one of the adjusted approximation methods to obtain $$(\rho_L^2, \rho_U^2).$$

Secondly, $$\tilde{\mu}_2(p_U^2, n, p) \text{ and } \tilde{\mu}_2(\rho_L^2, n, p)$$

are generated as the lower and upper limit of the CI, respectively. For most practical purposes, a (one-sided) 100(1−α) percent upper confidence bound for the mean PLPP may be more useful since smaller values of $\Delta_c$ are desirable. Therefore, it can be concluded with a 100(1−α) percent confidence that the generated upper bound is the maximum average proportional loss in predictive power for using the estimated regression equation, rather than the true equation, to make predictions over new sample data.

Accordingly, turning now to FIG. 6, a routine 600 that illustrates the generation of the 100(1−α) percent confidence interval is illustrated. The routine 600 begins at block 602 wherein the input data is generated using the raw data 304 from the sensor array 126. In block 604 a regression model is fit, and the usual square coefficient of multiple determinations: $R^2$ is generated in block 606. More specifically, $$R^2 = 1 - \frac{SSE}{SST},\ SSE = \sum_{i=1}^{n}(y_i - \hat{y}_i)^2,\ SST = \sum_{i=1}^{n}(y_i - \bar{y})^2.$$

In block 608, an approximate (1−α)100 percent two-sided CI, $$[\rho_L^2, \rho_U^2],$$

for the population square coefficient of multiple determination, $\rho^2$, is generated using the adjusted F approximation or the adjusted normal approximation methods, respectively.

Adjusted F Approximation Method

An approximate (1−α)100 percent two-sided CI for $\rho^2$ may be given as $$[\rho_L^2, \rho_U^2]$$

where $$\rho_L^2 \text{ and } \rho_U^2$$

are the solutions of the following nonlinear equations:

$$\rho^2 = \frac{(n-p-1)R^2 - (1-R^2)pF^{\alpha/2}_{\delta_{\hat{d}}, n-p-1}}{(n-p-1)\left[R^2 + (1-R^2)F^{\alpha/2}_{\delta_{\hat{d}}, n-p-1}\right]} \text{ and}$$

$$\rho^2 = \frac{(n-p-1)R^2 - (1-R^2)pF^{1-\alpha/2}_{\delta_{\hat{d}}, n-p-1}}{(n-p-1)\left[R^2 + (1-R^2)F^{1-\alpha/2}_{\delta_{\hat{d}}, n-p-1}\right]}$$

respectively. In the above, the notation $$F^{\alpha}_{d_1, d_2}$$

stands for $\alpha\times100^{th}$ upper percentile point of the F distribution with $d_1$ and $d_2$ degrees of freedom, $$\delta_{\hat{d}} = \frac{[(n-p-1)\rho^2 + p]^2}{n - 1 - (n-p-1)(1-\rho^2)^2 + (n-1)\left(\frac{1}{\hat{d}} - 1\right)\rho^4} \text{ and}$$

$$\hat{d} = \frac{2n}{(n-1)\hat{\gamma} - (n-3)}.$$

Also, the quantity $\hat{\gamma}$ is the sample (median) kurtosis of the fitted values from the regression model. More specifically, if $\hat{y}_1, \ldots, \hat{y}_n$ are the fitted values, $\bar{\hat{y}}$ the sample mean of the fitted values, and $\tilde{\hat{y}}$ is the sample median of the fitted values of the regression model then $\hat{\gamma}$ is calculated as follows:

$$\hat{\gamma} = \frac{\sum_{i=1}^{n}(\hat{y}_i - \bar{\hat{y}})^4}{\left[\sum_{i=1}^{n}(\hat{y}_i - \bar{\hat{y}})^2\right]^2}.$$

If the predictor data is known to have come from the multivariate normal distribution, then the true kurtosis $\gamma$ is 3, so that $d=\hat{d}=1$. As a result, these equations reduce to the conventional Helland's F approximation CIs.

Adjusted Normal Approximation Method

An approximate 100(1−α) percent two-sided CI for $\rho^2$ based on the adjusted normal approximation method is given by $$[\rho_L^2, \rho_U^2]$$

where $$\rho_L^2 \text{ and } \rho_U^2$$

are directly obtained as follows:

$$\rho_L^2 = 1 - \frac{1}{1 + T\exp(-z_{\alpha/2}\hat{\eta})} \text{ and } \rho_U^2 = 1 - \frac{1}{1 + T\exp(z_{\alpha/2}\hat{\eta})} \text{ where}$$

$$T = \frac{(n-3)R^2 - p}{(n-1)(1-R^2)},$$

$$\hat{\eta}^2 \equiv \frac{(n-p-3)\tau(\hat{d}, \hat{\theta})}{\hat{\theta}} =$$

$$2\frac{(n-3)p + 2(n-1)(n-3)T + (n-1)\left(n - 1 + \frac{n-p-3}{\hat{d}}\right)T^2}{(n-1)^2(n-p-5)T^2} \text{ and}$$

$$\hat{d} = \frac{2n}{(n-1)\hat{\gamma} - (n-3)}.$$

$z_\alpha$ is the $\alpha\times100^{th}$ upper percentile point of the standard normal distribution. If the predictor data is known to have come from the multivariate normal distribution, then the true kurtosis $\gamma$ is 3, so that $d=\hat{d}=1$. As a result, these CIs reduce to the conventional normal approximation CIs.

Turning back to FIG. 6, the corresponding CI for the non-centrality parameter, $\lambda$, of the distribution of $\Delta_c$ is generated as $[\lambda_L, \lambda_U]$ in block 610.

More specifically, $$\lambda_L = \frac{(n-p-2)\rho_L^2}{1-\rho_L^2},\ \lambda_U = \frac{(n-p-2)\rho_U^2}{1-\rho_U^2}.$$

In block 612, an approximate $(1-\alpha)100$ percent two-sided CI for the mean PLPP is generated as $$[\mu(\rho_U^2),\ \mu(\rho_L^2)].$$

More specifically, $$\mu(\rho_L^2) = \frac{p-1}{(\lambda_L+p)^3}\left[(\lambda_L+p)^2 + 2\lambda_L\right] \text{ and}$$

$$\mu(\rho_U^2) = \frac{p-1}{(\lambda_U+p)^3}\left[(\lambda_U+p)^2 + 2\lambda_U\right].$$

Using these routings, the predictive power evaluation engine 128, which may include the PLPP generator 408, may be used to generate, such as compute, the maximum possible average PLPP with some confidence level. Equivalently, the minimum possible average RSCVC with some confidence level can also be deduced from the PLPP upper confidence bound.

The PLPP (or equivalently, the RSCVC), is not used alone as a criterion for comparing candidate models in part because adding predictors to a model tends to increase the PLPP (or equivalently, decrease the RSCVC) of the resulting model. Viewed in this way, the PLPP (or equivalently, the RSCVC) is to quality of prediction what the $R^2$ statistic is to quality of fitness for an estimated regression equation. The PLPP (or the RSCVC), however, can be combined with the SCVC to build models and evaluate their predictive worthiness for deployment purposes. In many applications where the main task consists of choosing the "best" predictive regression model from a pool of candidate predictive models 306 the SCVC may be used as the criterion for comparing the models through a model selection process. The final selected predictive model 306, though the best predictive model 306 from the pool of candidate models, may not have adequate predictive power for deployment purposes. The SCVC of the final predictive model may not provide enough information for these purposes since its maximum possible value is unknown. The estimated PLPP (or RSCVC) of the final predictive model, however, can be used to accurately assess the predictive worthiness for deployment purposes. Consequently, the PLPP supplements the SCVC.

For small to large sample designs, the assessment of a fitted regression equation PLPP may be based on the new point estimates of the PLPP (or RSCVC) and standard error, or a one-sided upper confidence bound for the mean PLPP (or a one-sided lower confidence bound for the mean RSCVC). For very large sample or big data, the assessment can be based upon point-estimates.

Figure 7:
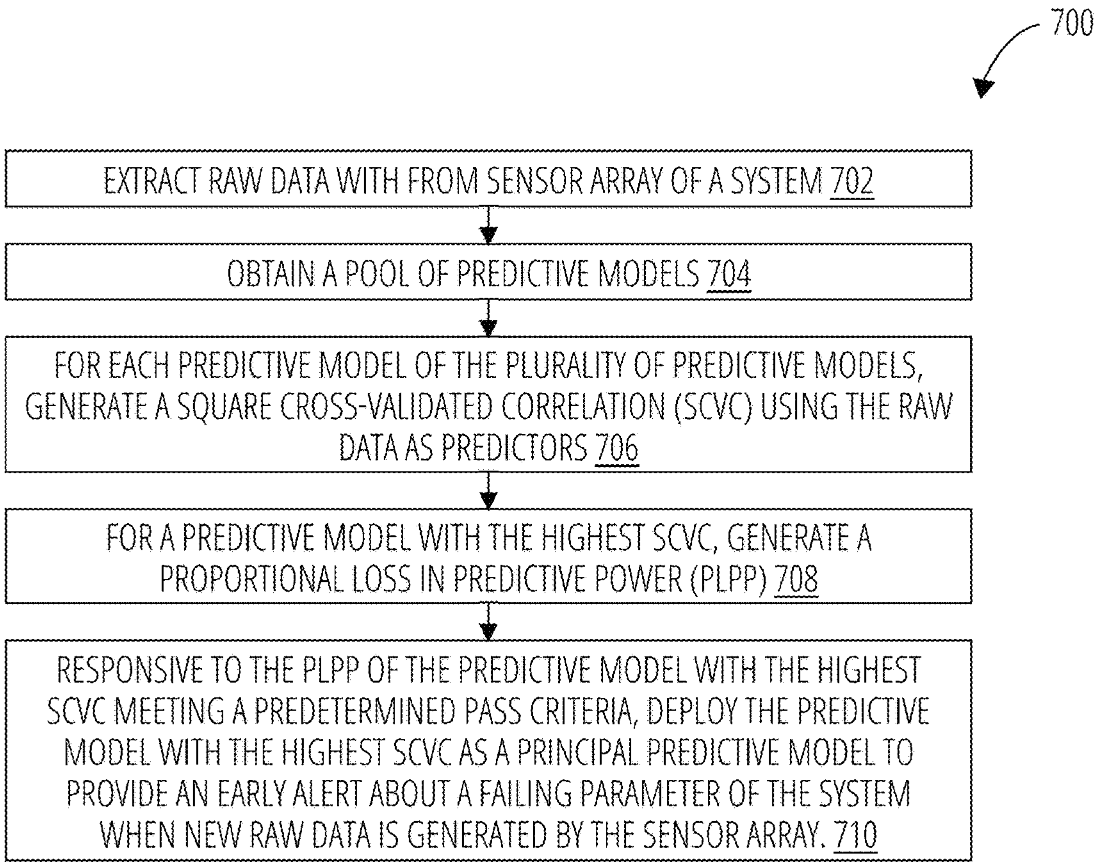
FIG. 7 depicts a generalized routine in accordance with an illustrative embodiment.

Turning now to FIG. 7, a generalized routine 700 for providing alerts in the data processing environment 100 is illustrated. The generalized routine 700 may be performed by or in conjunction with the predictive power evaluation engine 128. In block 702, raw data 304 is extracted from the sensor array 126 of an alert or monitoring system. In block 704, the predictive power evaluation engine 128 obtains a pool of predictive models 306. In block 706, the predictive power evaluation engine 128 generates an SCVC for each predictive model 306 of the plurality of predictive models, using the raw data 304 as predictors. In block 708, the predictive power evaluation engine 128 generates a PLPP for the predictive model 306 with the highest SCVC. In block 710, responsive to the PLPP meeting a predetermined pass criteria, the predictive model 306 with the highest SCVC is deployed as a principal predictive model 308 to provide an early alert about a failing parameter of the system when new raw data 304 is generated by the sensor array 126.

According to illustrative embodiments, another predictive model having a lower SCVC than the SCVC of the principal predictive model 308 is selected and marked as a challenger predictive model 310. When the SCVC of the challenger predictive model 310 becomes higher than the SCVC of the principal predictive model 308, and the PLPP of the challenger predictive model meets a predetermined pass criteria, the original principal predictive model can be replaced with the challenger predictive model which becomes the new principal predictive model.

According to illustrative embodiments, the raw data 304 is raw data 304 for a target application selected from the group consisting of product manufacturing or physical products, medical testing, physical/biological/chemical quality analyses, product authenticity and combinations thereof. Further, when the target application is product manufacturing, the raw data can be raw data about a plurality of raw materials, the raw data being representative of measured physical, chemical or biological properties (such as properties of the raw materials or other materials and equipment) in a manufacturing process, and the predictive models provide an early alert about a failing quality parameter of a final product of the product manufacturing. Even further, raw data from one or more sensors 302 of the sensor array 126 is not used for at least one of the predictive models. Therefore, variations in the number of predictors may be obtained for pool of predictive models being assessed.

In further embodiments, the PLPP as a point estimate of a sample PLPP using $$\hat{\delta}_c(\hat{\beta}) = \frac{p-1}{\hat{\lambda}+p},$$

wherein $\hat{\delta}_c(\hat{\beta})$ is the point estimate of the sample PLPP, $\hat{\lambda}$ is a point estimate of a non-centrality parameter, and p is a number of predictors. In embodiments, the PLPP can be generated as a $(1-\alpha)100$ percent lower confidence bound for the mean PLPP using $$\mu(\rho_U^2) = \frac{p-1}{(\lambda_U+p)^3}\left[(\lambda_U+p)^2 + 2\lambda_U\right],$$

wherein $$\mu(\rho_U^2)$$

is the $(1-\alpha)100$ percent lower confidence bound, $\lambda_U$ is an upper confidence bound for a non-centrality parameter, and p is the number of predictors. In embodiments, the PLPP can be generated as a $(1-\alpha)100$ percent upper confidence bound for the mean PLPP using $$\mu(\rho_L^2) = \frac{p-1}{(\lambda_L + p)^3}\left[(\lambda_L + p)^2 + 2\lambda_L\right],$$

wherein $$\mu(\rho_L^2)$$

is the $(1-\alpha)100$ percent upper confidence bound, $\lambda_L$ is a lower confidence bound for a non-centrality parameter, and p is the number of predictors.

In further embodiments, sensors of the sensor array are each configured to measure a physical, biological or chemical property of a material. Each sensor of the sensor array may also measure a different type of raw data.

Any specific manifestations of these and other similar example processes are not intended to be limiting to the invention. Any suitable manifestation of these and other similar example processes can be selected within the scope of the illustrative embodiments.

Thus, a computer implemented method, system or apparatus, and computer program product are provided in the illustrative embodiments for goodness of prediction assessment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser, or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a dedicated system or user's computer, partly on the user's computer or dedicated system, as a stand-alone software package, partly on the user's computer and partly on a remote computer or entirely on the remote computer or server, etc. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

What is claimed is:

1. A method comprising:

extracting raw data from a sensor array of a system;

obtaining a pool of predictive models;

for each predictive model of the pool of predictive models, generating a square cross-validated correlation (SCVC) using the raw data as predictors;

for a predictive model with the highest SCVC, generating a proportional loss in predictive power (PLPP), and responsive to the PLPP of the predictive model with the highest SCVC meeting a predetermined pass criteria, deploying the predictive model with the highest SCVC as a principal predictive model to provide an early alert about a failing parameter of the system when new raw data is generated by the sensor array.

2. The method of claim 1, wherein:

another predictive model having a lower SCVC than the SCVC of the principal predictive model is selected and marked as a challenger predictive model; and responsive to the SCVC of the challenger predictive model being higher than the SCVC of the principal predictive model, and the PLPP of the challenger predictive model meeting the predetermined pass criteria, replacing the deployed principal predictive model with the challenger predictive model.

3. The method of claim 1, wherein the raw data is raw data for a target application selected from the group consisting of product manufacturing, medical testing, physical/biological/chemical quality analyses, product authenticity and combinations thereof.

4. The method of claim 3, wherein:

the target application is product manufacturing;

the raw data is raw data about a plurality of raw materials, equipment, or ambient environment, the raw data being representative of properties of the plurality of raw materials, equipment, or ambient environment in a manufacturing process; and the predictive models provide an early alert about a failing quality parameter of a final product of the product manufacturing.

5. The method of claim 1, wherein raw data from one or more sensors of the sensor array is not used for at least one of the predictive models.

6. The method of claim 1, further comprising:

generating the PLPP as a point estimate of a sample PLPP using $$\hat{\delta}_c(\hat{\beta}) = \frac{p-1}{\hat{\lambda}+p},$$

wherein $\hat{\delta}_c(\hat{\beta})$ is the point estimate of the sample PLPP, $\hat{\lambda}$ is a point estimate of a non-centrality parameter, and p is a number of predictors.

7. The method of claim 1, further comprising:

generating the PLPP as a $(1-\alpha)100$ percent lower confidence bound for a mean PLPP using $$\mu(\rho_U^2) = \frac{p-1}{(\lambda_U+p)^3}\left[(\lambda_U+p)^2+2\lambda_U\right],$$

wherein $$\mu(\rho_U^2)$$

is the $(1-\alpha)100$ percent lower confidence bound, $\lambda_U$ is an upper confidence bound for a non-centrality parameter, and p is the number of predictors.

8. The method of claim 7, further comprising:

generating the PLPP as a (1−α)100 percent upper confidence bound for the mean PLPP using $$\mu(\rho_L^2) = \frac{p-1}{(\lambda_L + p)^3}\left[(\lambda_L + p)^2 + 2\lambda_L\right],$$

wherein $$\mu(\rho_L^2)$$

is the (1−α)100 percent upper confidence bound, $\lambda_L$ is a lower confidence bound for a non-centrality parameter, and p is the number of predictors.

9. A system comprising:

a sensor array comprising a plurality of sensors; and a processor configured to:

extract raw data from a sensor array of the system;

obtain a pool of predictive models;

for each predictive model of the pool of predictive models, generate a square cross-validated correlation (SCVC) using the raw data as predictors;

for a predictive model with the highest SCVC, generate a proportional loss in predictive power (PLPP); and responsive to the PLPP of the predictive model with the highest SCVC meeting a predetermined pass criteria, deploy the predictive model with the highest SCVC as a principal predictive model to provide an early alert about a failing parameter of the system when new raw data is generated by the sensor array.

10. The system of claim 9, wherein the sensor array comprises a plurality of sensors each configured to measure a physical, biological or chemical property of a material.

11. The system of claim 9, wherein each sensor of the sensor array measures a different type of raw data.

12. The system of claim 9, wherein the processor is further configured to:

generate the PLPP as a point estimate of a sample PLPP using $$\hat{\delta}_c(\hat{\beta}) = \frac{p-1}{\hat{\lambda} + p},$$

wherein $\hat{\delta}_c(\hat{\beta})$ is the point estimate of the sample PLPP, $\hat{\lambda}$ is a point estimate of a non-centrality parameter, and p is a number of predictors.

13. The system of claim 9, wherein the processor is further configured to:

generate the PLPP as a (1−α)100 percent lower confidence bound for a mean PLPP using $$\mu(\rho_U^2) = \frac{p-1}{(\lambda_U + p)^3}\left[(\lambda_U + p)^2 + 2\lambda_U\right],$$

wherein $$\mu(\rho_U^2)$$

is the (1−α)100 percent lower confidence bound, $\lambda_U$ is an upper confidence bound for a non-centrality parameter, and p is the number of predictors.

14. The system of claim 13, wherein the processor is further configured to:

generate the PLPP as a (1−α)100 percent upper confidence bound for the mean PLPP using $$\mu(\rho_L^2) = \frac{p-1}{(\lambda_L + p)^3}\left[(\lambda_L + p)^2 + 2\lambda_L\right],$$

wherein $$\mu(\rho_L^2)$$

is the (1−α)100 percent upper confidence bound, $\lambda_L$ is a lower confidence bound for a non-centrality parameter, and p is the number of predictors.

15. A non-transitory computer readable storage medium storing program instructions which, when executed by a processor, causes the processor to perform a procedure comprising:

extracting raw data with a sensor array of a system;

obtaining a pool of predictive models;

for each predictive model of the pool of predictive models, generating a square cross-validated correlation (SCVC) using the raw data as predictors;

for a predictive model with the highest SCVC, generating a proportional loss in predictive power (PLPP), and responsive to the PLPP of the predictive model with the highest SCVC meeting a predetermined pass criteria, deploy the predictive model with the highest SCVC as a principal predictive model to provide an early alert about a failing parameter of the system when new raw data is generated by the sensor array.

16. The non-transitory computer readable storage medium of claim 15, wherein:

another predictive model having a lower SCVC than the SCVC of the principal predictive model is selected and marked as a challenger predictive model; and responsive to the SCVC of the challenger predictive model being higher than the SCVC of the principal predictive model, and the PLPP of the challenger predictive model meeting the predetermined pass criteria, replacing the deployed principal predictive model with the challenger predictive model.

17. The non-transitory computer readable storage medium of claim 15, wherein the raw data is raw data for a target application selected from the group consisting of product manufacturing, medical testing, physical/biological/chemical quality analyses, product authenticity and combinations thereof.

18. The non-transitory computer readable storage medium of claim 15, wherein the procedure further comprises:

generating the PLPP as a point estimate of a sample PLPP using $$\hat{\delta}_c(\hat{\beta}) = \frac{p-1}{\hat{\lambda} + p},$$

wherein $\hat{\delta}_c(\hat{\beta})$ is the point estimate of the sample PLPP, $\hat{\lambda}$ is a point estimate of a non-centrality parameter, and p is a number of predictors.

19. The non-transitory computer readable storage medium of claim 15, wherein the procedure further comprises:

generating the PLPP as a (1−α)100 percent lower confidence bound for a mean PLPP using $$\mu(\rho_U^2) = \frac{p-1}{(\lambda_U + p)^3}\left[(\lambda_U + p)^2 + 2\lambda_U\right],$$

wherein $$\mu(\rho_U^2)$$

is the (1−α)100 percent lower confidence bound, $\lambda_U$ is an upper confidence bound for a non-centrality parameter, and p is the number of predictors.

20. The non-transitory computer readable storage medium of claim 19, wherein the procedure further comprises:

generating the PLPP as a (1−α)100 percent upper confidence bound for the mean PLPP using $$\mu(\rho_L^2) = \frac{p-1}{(\lambda_L + p)^3}\left[(\lambda_L + p)^2 + 2\lambda_L\right],$$

wherein $$\mu(\rho_L^2)$$

is the (1−α)100 percent upper confidence bound, $\lambda_L$ is a lower confidence bound for a non-centrality parameter, and p is the number of predictors.

* * * * *